US006256688B1

(12) United States Patent
Suetaka et al.

(10) Patent No.: US 6,256,688 B1
(45) Date of Patent: Jul. 3, 2001

(54) INTERFACE APPARATUS OPERABLE BY USING FLOPPY DISK DRIVE

(75) Inventors: Hiroyuki Suetaka, Akishima; Tatsuo Arai, Fussa, both of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/203,637

(22) Filed: Dec. 1, 1998

(30) Foreign Application Priority Data

Dec. 2, 1997 (JP) .................................................... 9-331779

(51) Int. Cl.$^7$ .......................... G06F 13/12; G06F 13/18; G06K 7/06; G06K 7/00
(52) U.S. Cl. ................................ 710/73; 710/62; 710/65; 710/73; 235/441; 235/486
(58) Field of Search ..................................... 235/441, 486, 235/487, 492; 361/685, 737; 710/2, 62, 64, 73, 12, 65

(56) References Cited

U.S. PATENT DOCUMENTS

| 5,440,449 | * | 8/1995 | Scheer ................................. 361/686 |
| 5,584,043 | * | 12/1996 | Burkart ................................. 710/62 |
| 5,663,553 | * | 9/1997 | Aucsmith ............................ 235/492 |
| 5,736,727 | * | 4/1998 | Nakata et al. ...................... 235/487 |
| 5,844,780 | * | 12/1998 | Deguchi ............................. 361/737 |
| 5,850,189 | * | 12/1998 | Sakanaka et al. ............. 340/825.72 |
| 5,936,226 | * | 8/1999 | Aucsmith ............................ 235/492 |
| 6,015,093 | * | 1/2000 | Barrett et al. ....................... 235/492 |
| 6,016,962 | * | 1/2000 | Nakata et al. ...................... 235/486 |
| 6,042,009 | * | 3/2000 | Barrett et al. ....................... 235/441 |
| 6,089,459 | * | 7/2000 | Eisele et al. ......................... 235/492 |

FOREIGN PATENT DOCUMENTS 4-291573   10/1992 (JP) .

* cited by examiner

Primary Examiner—Thomas Lee
Assistant Examiner—Chun Cao
(74) Attorney, Agent, or Firm—Frishauf, Holtz, Goodman, Langer & Chick, P.C.

(57) ABSTRACT

An interface apparatus is inserted into a floppy disk drive unit so as to establish an infrared data communication between a desk top type personal computer and a digital still camera even when this desk top type personal computer is not equipped with an infrared communication port. This interface apparatus is arranged by employing: a casing unit having an entire shape substantially identical to that of a floppy disk and having a head window portion; a magnetic interface provided in the head window portion of the casing unit, and abutting against a magnetic head of a floppy disk drive so as to transmit/receive data to/from the magnetic head; a projected portion projected from a floppy disk insertion port of the floppy disk drive when the interface apparatus is loaded on the floppy disk drive; an infrared port arranged in the projected portion; an infrared port controller for controlling the infrared port to establish an infrared communication between the infrared port and an external electronic appliance; and a data converting circuit for converting the data used between the external electronic appliance connected via the connection mechanism to the interface apparatus, and the magnetic interface.

5 Claims, 4 Drawing Sheets

INTERFACE APPARATUS OPERABLE BY USING FLOPPY DISK DRIVE

BACKGROUND OF THE INVENTION

1. Field of the Invention

The present invention generally relates to an interface apparatus operable by using a floppy disk drive. More specifically, the present invention is directed to an interface apparatus for an infrared communication with a digital sill camera, operable while being loaded on a floppy disk drive of a personal computer.

2. Description of the Related Art

Very recently, digital still cameras are widely used to acquire still image in a very simple manner. The still image data acquired by such digital still cameras are displayed on television screens, or loaded on personal computers to be image-processed.

In this sort of digital still camera, the acquired still image data are stored into either a memory of the digital still camera or a storage medium such as a compact floppy disk thereof. The image data read from this memory, or storage medium during reproduction mode are transferred via a cable connected to an external output terminal of the camera to the television, or the personal computer.

In particular, a desk top type personal computer is typically equipped with connectors provided on a rear surface of a computer main body. These connectors are used to connect this personal computer to a computer peripheral device such as a printer. Accordingly, cumbersome manipulations are necessarily required so as to connect a digital still camera to such a desk top type personal computer.

Also, to transmit/receive image data between a personal computer and a digital still camera, the following data communication method is conceivable. That is, while using a medium equipped with a floppy-disk-shaped case, a detachable type memory is mounted in this floppy-disk-shaped case, and is derived from another electronic appliance. Then, this memory-mounted medium is operated by using a floppy disk drive. However, this data communication method has a drawback in that cumbersome detaching operation is required to detach this memory from the case.

Furthermore, a large number of digital still cameras are normally equipped with infrared ports designed in accordance with the IrDA (Infrared Data Association) standard, and thus are capable of outputting still image data as infrared signals. To the contrary, most of the above-explained desk top type personal computers are not usually equipped with such infrared ports of the IrDA standard. As a result, the above-explained cumbersome manipulations required to connect the digital still camera to this desk top type personal computer conventionally cannot be avoided by utilizing the infrared communication function.

In addition, these inconvenient manipulations and cumbersome operations are similarly required between personal computers and other computer peripheral devices, for example, a portable printer, a portable personal computer, and a portable telephone.

SUMMARY OF THE INVENTION

The present invention has been made to solve the above-described problems, and therefore, has an object to provide an interface apparatus capable of establishing a data communication (including an infrared data communication) between a personal computer and a computer peripheral device such as a digital still camera in a simple manner and an easy manipulation.

To achieve the above-described object, an interface apparatus, according to a first aspect of the present invention, is featured by comprising:

a casing unit having an entire shape substantially identical to that of a floppy disk and having a head window portion;

a magnetic interface provided in the head window portion of the casing unit, and abutting against a magnetic head of a floppy disk drive so as to transmit/receive data to/from the magnetic head;

a connection mechanism conducted from a floppy disk insertion port of the floppy disk drive to be connected to an external electronic appliance when the interface apparatus is loaded on the floppy disk drive; and a data converting circuit for converting the data used between the external electronic appliance connected via the connection mechanism to the interface apparatus, and the magnetic interface.

Also, in this interface apparatus, the connection mechanism contains a portion constructed of a flat cable.

Also, the interface apparatus is further comprised of: a power generating mechanism provided within the casing unit, for generating electric power in response to rotations of a spindle motor employed in the floppy disk drive; and a power stabilizing circuit for stabilizing the electric power generated from the power generating mechanism.

Further, the interface apparatus is further comprised of a microcontroller for controlling the data converting circuit to convert the data used between the external electronic appliance and the magnetic interface.

Also, in the interface apparatus, the casing unit has a notched portion to which the connection mechanism is connected.

An interface apparatus, according to a second aspect of the present invention, is featured by comprising:

a casing unit having an entire shape substantially identical to that of a floppy disk and having a head window portion;

a magnetic interface provided in the head window portion of the casing unit, and abutting against a magnetic head of a floppy disk drive so as to transmit/receive data to/from the magnetic head;

a projected portion projected from a floppy disk insertion port of the floppy disk drive when the interface apparatus is loaded on the floppy disk drive;

an infrared port arranged in the projected portion;

an infrared port controller for controlling the infrared port to establish an infrared communication between the infrared port and an external electronic appliance; and a data converting circuit for converting the data used between the external electronic appliance connected via the connection mechanism to the interface apparatus, and the magnetic interface.

Also, the interface apparatus is further comprised of a battery for supplying electric power to the infrared port controller.

Also, the interface apparatus is further comprised of a rechargeable cell recharged by the electric power generated by the generator.

Further, the interface apparatus is further comprised of a hinge portion provided between the projected portion of the casing unit and the infrared port.

Moreover, an interface apparatus, according to a third aspect of the present invention, is featured by comprising:

a casing unit having a substantially flat shape;

a magnetic interface provided on ne of a front surface of the casing unit and a rear surface thereof, and abutting against a magnetic head to transmit/receive data between the magnetic head and the magnetic interface;

a connection mechanism conducted from a floppy disk insertion port of a floppy disk drive to be connected to an external electronic appliance when the interface apparatus is loaded on the floppy disk drive; and a data converting circuit for converting the data used between the magnetic interface and said external electronic appliance connected to the interface apparatus by the connection mechanism.

In accordance with the above-described interface apparatuses of the present invention, the image data can be transmitted/received between the desk top type personal computer and the portable type electronic appliance such as the digital still camera. That is, while a floppy disk drive usually mounted on such a desk top type personal computer is used to load this interface apparatus, the digital still camera can be readily connected via this interface apparatus to the desk top type personal computer so as to transmit/receive the image data.

With employment of the above-explained infrared communication function of the second interface apparatus, the digital still camera having the infrared communication function can be readily connected even with a desk top type personal computer and a floppy disk drive which are not generally equipped with an infrared communication function as a standard feature. As a consequence, the image data can be transmitted/received between the digital still camera and the desk top type personal computer without the infrared communication port in a very simple and easy manner.

BRIEF DESCRIPTION OF THE DRAWINGS

For a better understanding of the present invention, reference is made of a detailed description to be read in conjunction with the accompanying drawings, in which.

DESCRIPTION OF THE PREFERRED EMBODIMENTS

Referring now to drawings, various preferred embodiments of the present invention will be described in detail.

Figure 1:
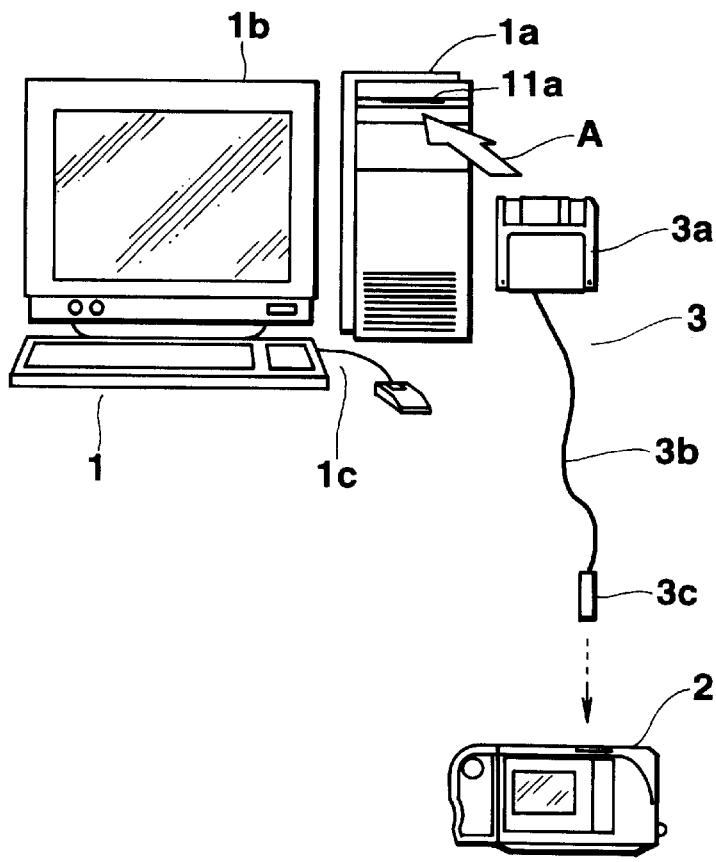
FIG. 1 illustratively shows a computer-digital still camera system arrangement containing an interface apparatus according to a first embodiment of the present invention.
Figure 2:
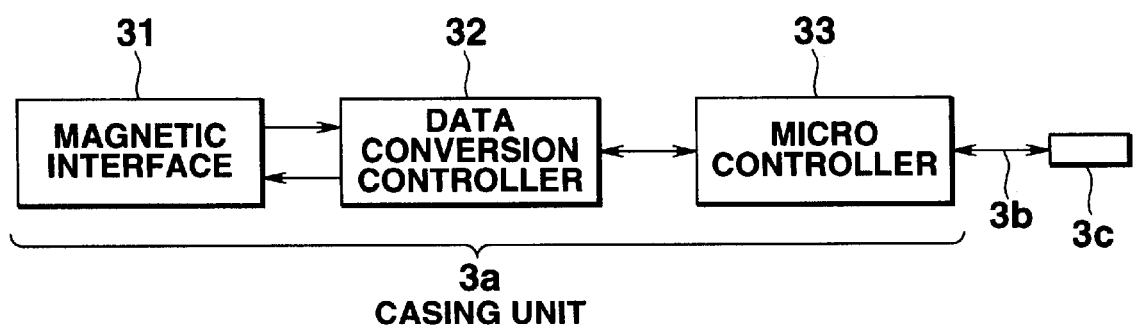
FIG. 2 is a schematic block diagram for representing a functional circuit arrangement of the interface apparatus according to the first embodiment of the present invention.

System Arrangement with Interface Apparatus/Personal Computer/Digital Still Camera FIG. 1 schematically illustrates a system arrangement with employment of an interface apparatus according to a first embodiment of the present invention which may interface a personal computer with a digital still camera. As indicated in FIG. 1, reference numeral 1 indicates a personal computer. This personal computer 1 comprises a personal computer main body 1a, a monitor display 1b, and a keyboard with a mouse 1c. Reference numeral 2 indicates a digital still camera. Also, reference numeral 3 represents an interface apparatus, according to the first embodiment of the present invention, which interfaces the personal computer 1 with the digital still camera 2.

This interface apparatus 3 comprises a casing unit 3a, a cable unit 3b, and a connector unit 3c. The casing unit 3a has the same shape as that of a typical 3.5-inch type floppy disk. The cable unit 3b is conducted from one end side of this casing unit 3a. This one end side is located at a label area which is positioned opposite to the other end side of this casing unit 3a. On other side, a shutter of the casing unit 3a is formed. The connector unit 3c is arranged at a tip portion of this cable unit 3b.

In this system, the casing unit 3a of the interface apparatus 3 according to the first embodiment is inserted into an insertion port 11a of a floppy disk drive 11 (not shown in FIG. 1) employed in the personal computer main body 11a of the personal computer 1 along a direction indicated by an arrow "A". On the other hand, the connector unit 3c is connected to an image output terminal (not shown in detail) of the digital still camera 2, and then preselected image acquisition software is initiated by the personal computer 1. As a result, still image data which have been acquired/stored in this digital still camera 2 may be acquired via this interface apparatus 3 to the personal computer 1.

Functional Circuit Arrangement of Interface Apparatus

Figure 3:
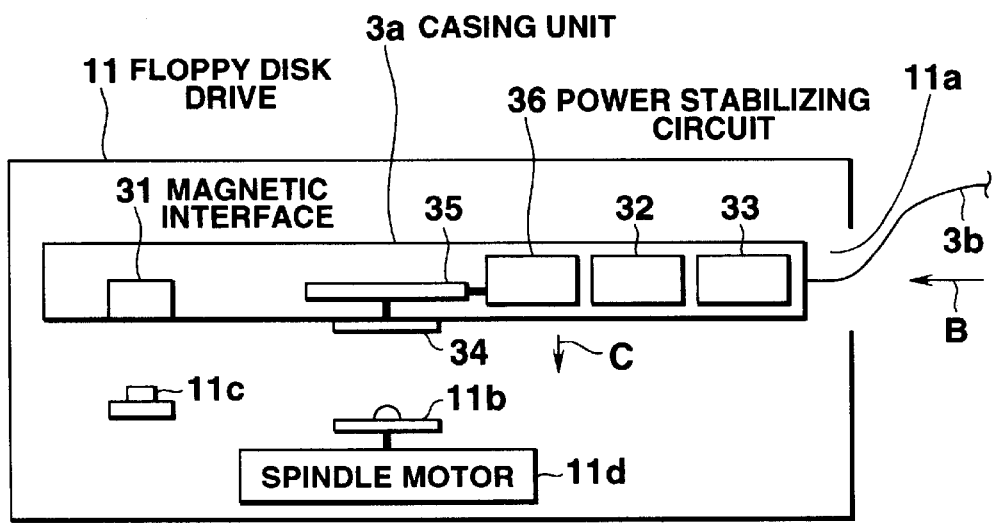
FIG. 3 schematically represents the interface apparatus of FIG. 2 actually set to a floppy disk drive of a personal computer.

FIG. 3 represents a functional circuit arrangement of the above-described interface apparatus 3. Within the casing unit 3a of this first interface apparatus 3, a magnetic interface 31, a data conversion controller 32, and a microcontroller 33 are provided.

As will be described, the magnetic interface 31 is provided in a head window of the casing unit 3a. This head window is normally shielded/closed by a shutter. This magnetic interface 31 abuts against a magnetic head (not shown) of the floppy disk drive 11 when the casing unit 3a is loaded on this floppy disk drive 11, so that data may be transmitted/received between this magnetic interface 31 and the magnetic head of the floppy disk drive 11. The data conversion controller 32 converts the data in accordance with an interface standard of a floppy disk in order to transmit/receive the data used in the magnetic interface 31. The microcontroller 33 controls the data converting process operation executed in this data conversion controller 32 based upon a preset operation program. This microcontroller 33 executes the conversions in accordance with the interface standard of the floppy disk, and also the interface standard of the digital camera 2.

Loading of First Interface Apparatus on Floppy Disk Drive

FIG. 3 schematically shows loading of the first interface apparatus 3 on the floppy disk drive 11. Concretely speaking, the components of the casing unit 3a of the interface apparatus 3 are loaded on the floppy disk drive 11 of the personal computer mainbody 1a in the personal computer 1. FIG. 3 represents such a condition that the casing unit 3a is inserted into the insertion port 11a of the floppy disk drive 11 along a direction indicated by an arrow "B". Since this casing unit 3a is inserted into the floppy disk drive 11, the shutter mounted on the casing unit 3a is opened, so that the shielding/closing condition of the above-described head window is released.

Thereafter, the casing unit 3a is moved downwardly along another direction indicated by an arrow "C", and then a central metal hub 34 formed on the lower surface of the casing unit 3a is set to a chucking table 11b of the floppy disk drive 11. This shucking table 11b is equipped with a disk absorbing magneto. As a result, loading of the interface apparatus 3 on the floppy disk drive 11 is completed, and the magnetic interface 31 abuts against the magnetic head 11c provided on the side of the floppy disk drive 11. Similar to this magnetic head 11c, the magnetic interface 31 comprises a coil wound on a magnetic material (not shown in detail).

In this first embodiment, a generator 35 is employed in such a manner that this generator 35 is directly coupled to the above-described metal hub 34. Thus, rotation force of a spindle motor 11d is transferred via the chucking table 11b and the metal hub 34 to the generator 35. An AC current generated from this generator 35 is rectified by a power stabilizing circuit 36 to produce a DC current. A voltage value of this DC power is stabilized, and therefore the stabilized DC power can be supplied to the data conversion controller 32 and the microcontroller 33.

Also, this stabilized DC power from the power stabilizing circuit 36 is further supplied via the cable unit 3b and the casing unit 3a to the digital still camera 2. As a result, it is possible to avoid such a condition that battery power of a battery build in the digital still camera 2 is consumed by connecting this interfacing apparatus 3 to the floppy disk drive 11.

Concrete Structures of Casing Unit/Cable Unit

Figure 4:
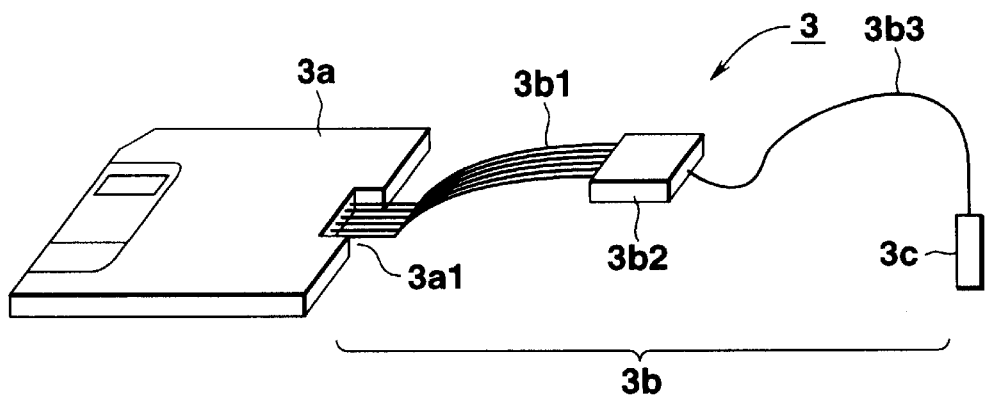
FIG. 4 is a perspective view for exemplifying a main structure (casing unit and cable unit) of the interface apparatus shown in FIG. 2.

FIG. 4 is an illustration for mainly showing concrete structures of the casing unit 3a and the cable unit 3b in the first interface apparatus 4.

Concretely speaking, a notch portion 3a1 is formed in a connection portion between the casing unit 3a and the cable unit 3b in order that the interface apparatus 3 is allowed to be loaded on such a floppy disk drive having a large descent amount along the direction indicated by the arrow "C" shown in FIG. 3. A flexible flat cable 3b1 is conducted from this notch portion 3a1. Then, this flat cable 3b1 is connected via a cable conversion portion 3b2 to a round type cable 3b3. A connector portion 3c for connecting the digital still camera 2 is provided at a tip portion of the round type cable 3b3.

Since the above-described first interface apparatus 3 has such a structure that the notch portion 3a1 is formed in the casing unit 3a so as to conduct the flexible flat cable 3b1, this first interface apparatus 3 may be usually used in desk top type personal computers. Even when the casing unit 3a is loaded on such a floppy disk drive 11 with a large descent amount for the loading operation, this interface apparatus 3 may be smoothly ejected out from the floppy disk drive 11 due to flexibility of the flat cable 3b1. As a consequence, there is no risk that unwanted stress is given to both the casing unit 3a and the cable unit 3b.

Generally speaking, since shapes of connectors for flat cables are inconvenient, these flat cable connectors are not usually used in digital still cameras. Since most digital still cameras employ either round type connectors or rectangular type connectors, the flat cable 3b1 is converted into the round type cable 3b3 by the above-explained cable conversion portion 3b2, and thereafter this round type cable 3b3 may be connected to the connector portion 3c.

Image Data Transfer by First Interface Apparatus

A first description will now be made of a data transfer operation with employment of the above-explained interface apparatus 3 according to the first embodiment, namely, image data is transferred from the personal computer 1 to the digital still camera 2 via the first interface apparatus 3.

Under such a condition that the casing unit 3a of the interface apparatus 3 according to the first embodiment is loaded on the floppy disk drive 11 of the personal computer 1, the magnetic interface 31 abuts against the magnetic head 11c, and a magnetic pulse produced from the magnetic head 11c is received by the magnetic interface 31, so that this magnetic pulse is converted into an electric pulse signal. The data conversion controller 32 performs various process operations for this electric pulse series under control of the microcontroller 33. For instance, a framing process and CRC checking process are carried out, and then the processed pulse signal series are reconstructed to obtain a series of 8-bit data block. Then, the 8-bit data blocks are supplied to the microcontroller 33.

The microcontroller 33 interprets the content of the digital image data derived from the data conversion controller 32 to derive a necessary image portion of the image data, and thereafter transmits the derived necessary image data via the cable unit 3b and the connector unit 3c of this interface apparatus 3 to the digital still camera 2 in accordance with a preset communication protocol of this digital still camera 2.

On the other hand, when still image data acquired by the digital still camera 2 is transferred via this fist interface apparatus 3 to the personal computer 1, this image data acquired from the digital still camera 2 is received by the microcontroller 33 in accordance with a preset communication protocol. After the microcontroller 33 processes the received image data to obtain a series of image data block in order that the format of this received image data can be fitted to the interface standard of the floppy disk, this microcontroller 33 supplies this image data block to the data conversion controller 32. Then, the data conversion controller 32 converts the digital image data derived from the microcontroller 33 into an electric pulse signal series, and then supplies this electric pulse signal series to the magnetic interface 31. As a result, magnetic pulses are produced by the magnetic head 11c provided on the side of the floppy disk drive 11 by receiving this electric pulse signal series. Therefore, the still image data of the digital still camera 2 is transferred via the first interface apparatus 3 to the personal computer 1.

It should be noted that in the above-explained first embodiment, the microcontroller 33 and the data conversion controller 32 are employed within the casing unit 3a. Alternatively, these controllers 33 and 32 may be provided within, for example, the cable converting unit 3b2.

As previously explained, in accordance with the interface apparatus of the first embodiment, the image data can be transmitted/received between the desk top type personal computer and the portable type electronic appliance such as the digital still camera. That is, while a floppy disk drive usually mounted on such a desk top type personal computer is used to load this interface apparatus, the digital still camera can be readily connected via this interface apparatus to the desk top type personal computer so as to transmit/receive the image data.

Also, other external electronic appliances may be easily connected via the cable to the personal computer.

In addition, since the electric power is generated by using the rotation force of the spindle motor mounted in the floppy disk drive, the electric power can be supplied not only to this interface apparatus, but also the external electric appliance.

Arrangement of Second Interface Apparatus

In the above-described first embodiment, the interface apparatus 3 is used to connect the personal computer 1 with the digital still camera 2 by way of the line connection with employment of the cable unit 3b and the connector unit 3c. Alternatively, since most digital still cameras 2 are equipped with infrared ports adapted to the IrDA (Infrared Data Association) standard, image data may be transmitted/received in the form of infrared signals.

Figure 5:
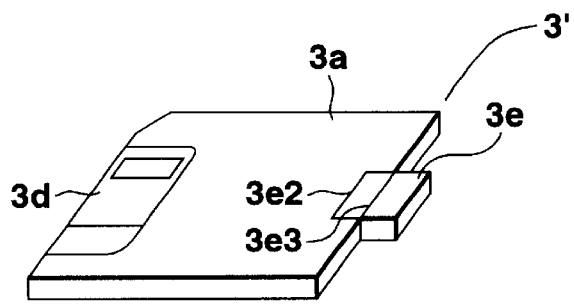
FIG. 5 is a perspective view for indicating a structural example of an interface apparatus according to an second embodiment of the present invention.

FIG. 5 is a perspective view for indicating a structure of an interface apparatus 3' according to a second embodiment of the present invention, by which image data may be transmitted/received in the form of an infrared signal. As indicated in FIG. 5, in this second interface apparatus 3', an infrared port 3e is provided within the casing unit 3a in such a manner that this infrared port 3e is projected from a center portion of one edge of this casing unit 3a. This infrared portion 3e is located opposite to a shutter 3d in a label area of the casing unit 3a, and this edge portion is gripped by a hand of a user. This infrared port 3e is equipped with an infrared light transmitting/receiving window 3e1 (see FIG. 6) on the projected edge surface. This infrared light transmitting/receiving window 3e1 contains an infrared light emitting element and an infrared light receiving element. Also, the infrared light transmitting/receiving window 3e1 is further equipped with two sets of hinge portions 3e2 and 3e3. Accordingly, the infrared light transmitting/receiving window 3e1 may be firmly projected even from such a floppy disk drive with a large descent amount in a floppy disk loading operation.

Figure 6:
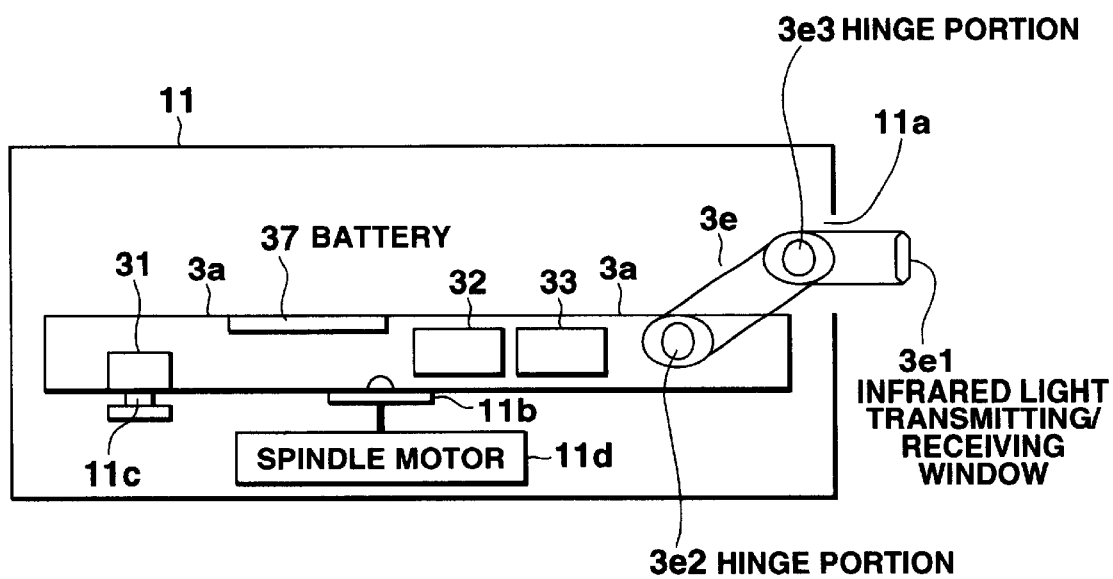
FIG. 6 schematically represents the interface apparatus of the second embodiment actually set to a floppy disk drive of a personal computer.

FIG. 6 schematically represents such a loading condition that the second interface apparatus 3' is loaded on the floppy disk drive 11 of the personal computer main body 1a of the personal computer 1. That is, the casing unit 3a of the second interface apparatus 3' has been completely loaded and the infrared port 3e is projected from this floppy disk drive 11.

Precisely speaking, the infrared light transmitting/receiving window 3e1 of this infrared port 3e is projected via the insertion port 11a of the floppy disk drive 11 from the floppy disk drive 11 by using two sets of hinge portions 3e2 and 3e3. Even when this second interface apparatus 3' having the above-explained structure is loaded on such a floppy disk drive 11 having the large descent amount in the loading operation, wireless communication connection can be firmly established between the digital still camera 2 (not shown in FIG. 6) and this second interface apparatus 3' by using the infrared communication function.

Functional Circuit Arrangement of Second Interface Apparatus

Figure 7:
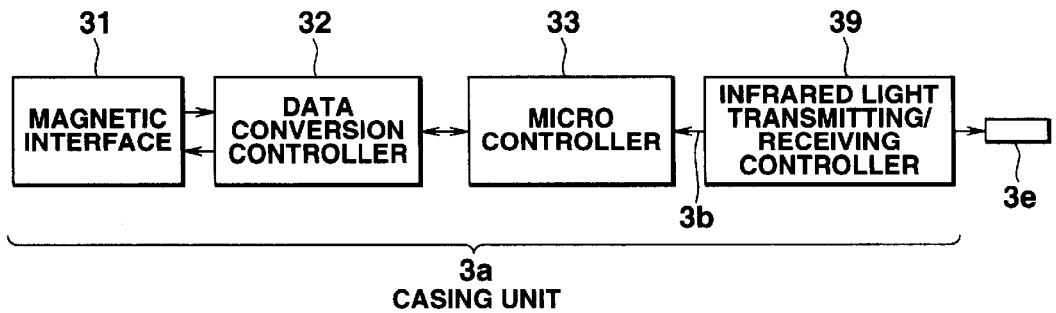
FIG. 7 is a schematic block diagram for showing a functional circuit arrangement of the interface apparatus according to the second embodiment.

FIG. 7 schematically shows a functional circuit arrangement of the casing unit 3a employed in the above-explained interface apparatus 3' according to the third embodiment.

Within this casing unit 3a, there are provided a magnetic interface 31, a data conversion controller 32, a microcontroller 33, an infrared light transmitting/receiving controller 39, and the above-described infrared port 3e.

Figure 8:
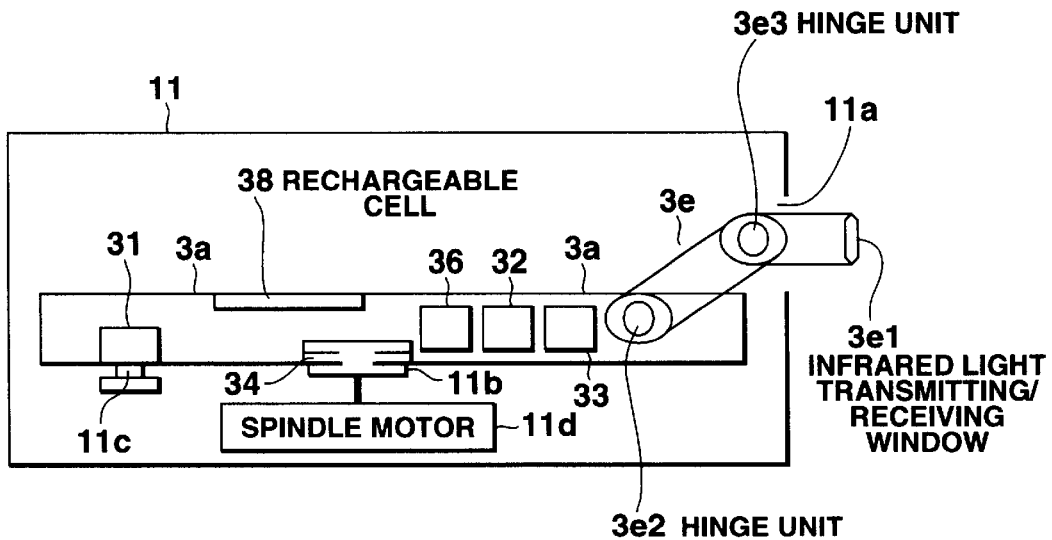
FIG. 8 schematically indicates another interface apparatus according to a modification of the second embodiment actually set to a floppy disk drive of a personal computer.

It should be noted that in the second interface apparatus 3' shown in FIG. 6, a battery 37 is assembled as the power supply instead of the generator 35 shown in FIG. 3. However, if sufficiently high electric power may be expectedly generated from this generator 35 of FIG. 3, then this high power generator 35 may be employed in this second interface apparatus 3' instead of the above-explained battery 37. Alternatively, as represented in a modification of FIG. 8, a rechargeable cell 38 is employed instead of the battery 37, and further this rechargeable cell 38 is used in combination with the generator 35 of FIG. 3 in such a manner that the electric power generated from this generator 35 is used to charge the rechargeable cell 38, which can be of great pratical use.

With employment of the above-explained infrared communication function of the second interface apparatus 3', the digital still camera 2 having the infrared communication function can be readily connected even with a desk top type personal computer 1 and a floppy disk drive 11 which are not generally equipped with an infrared communication function as a standard feature. As a consequence, the image data can be transmitted/received between the digital still camera and the desk top type personal computer without the infrared communication port in a very single and easy manner.

As previously explained, in accordance with the interface apparatuses of the second embodiment and of the modification thereof, the image data can be transmitted/received between the desk top type personal computer and the portable type electronic appliance such as the digital still camera. That is, while a floppy disk drive usually mounted on such a desk top type personal computer is used to load this interface apparatus, the digital still camera can be readily connected via this interface apparatus to the desk top type personal computer so as to transmit/receive the image data.

Also, there is another advantage that even when such a desk top type personal computer having no infrared communication function is used, the image data can be transmitted/received in the no-contact manner with, in particular, a portable electronic appliance equipped with an infrared communication function.

Moreover, in the case that the electric power is generated and the recharging operation is performed by utilizing the rotation force of the spindle motor mounted in the floppy disk drive, the battery built in the interface apparatus is no longer replaced by a new battery.

It should also be noted that in the above-described various embodiments, the desk top type personal computer 1 is connected to the digital still camera 2 via the relevant interface apparatus. The present invention is not limited to these combinations, but may be modified, changed, or substituted. For instance, a personal computer may be connected to a peripheral appliance such as a printer via the interface apparatus of the present invention. Alternatively, one personal computer may be connected to another personal computer via the interface apparatus of the present invention.

What is claimed is:

1. An interface apparatus comprising:
   a casing unit having a shape substantially identical to a shape of a floppy disks, and having a head window portion;

a magnetic interface that is provided in said head window portion of the casing unit, and that is adapted to abut against a magnetic head of a floppy disk drive of an external electronic appliance so as to transmit/receive data to/from said magnetic head;

an infrared port communicating with said magnetic interface;

at least one hinge portion that couples said infrared port and said casing unit in a manner such that said infrared port is adapted to project from a floppy disk insertion port of said floppy disk drive when said interface apparatus is loaded into said floppy disk drive by descending therein; and an infrared port controller that controls said infrared port to establish an infrared communication between said infrared port and the external electronic appliance via said magnetic interface and the magnetic head of said floppy disk drive of the external electronic appliance.

2. An interface apparatus as claimed in claim 1, further comprising a battery that supplies electric power to said infrared port controller.

3. An interface apparatus as claimed in claim 1, further comprising:

a power generating mechanism that is provided within said casing unit, and that generates electric power in response to rotations of a spindle motor employed in said floppy disk drive; and a power stabilizing circuit that stabilizes the electric power generated by said power generating mechanism.

4. An interface apparatus as claimed in claim 1, further comprising a rechargeable cell that is rechargeable by the electric power generated by said generator.

5. An interface apparatus as claimed in claim 1, further comprising a data converting circuit that converts data communicated between the external electronic appliance and said interface apparatus into a usable form.

\* \* \* \* \*

UNITED STATES PATENT AND TRADEMARK OFFICE
CERTIFICATE OF CORRECTION

PATENT NO.      : 6,256,688 B1
DATED           : July 3, 2001
INVENTOR(S)     : Hiroyuki Suetaka et al.

It is certified that error appears in the above-identified patent and that said Letters Patent is hereby corrected as shown below:

<u>Title page,</u>
Item [54], Title, after "DRIVE" insert -- WITH PROJECTABLE INFRARED PORT --.

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,256,688 B1
DATED : July 3, 2001
INVENTOR(S) : Hiroyuki Suetaka

It is certified that error appears in the above-identified patent and that said Letters Patent is hereby corrected as shown below:

Column 10,
Line 12, change "claim 1" to -- claim 3 --;
Line 13, after "by the", add -- generated --; and
Line 14, delete "generated by said generator".

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,256,688 B1
DATED : July 3, 2001
INVENTOR(S) : Hiroyuki Suetaka et al It is certified that error appears in the above-identified patent and that said Letters Patent is hereby corrected as shown below:

Column 10,
Line 12, change "1" to -- 3 --.

Signed and Sealed this

Seventh Day of September, 2004

JON W. DUDAS
*Director of the United States Patent and Trademark Office*